US007823485B2

(12) United States Patent
Rainone

(10) Patent No.: US 7,823,485 B2
(45) **Date of Patent: *Nov. 2, 2010**

(54) DIGITAL BEAM TORQUE WRENCH

(75) Inventor: Michael D. Rainone, Palestine, TX (US)

(73) Assignee: Brown Line Metalworks, LLC, Chicago, IL (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/115,367

(22) Filed: May 5, 2008

(65) Prior Publication Data

US 2009/0071300 A1 Mar. 19, 2009

Related U.S. Application Data

(63) Continuation of application No. 11/500,064, filed on Aug. 7, 2006, now Pat. No. 7,367,250.

(60) Provisional application No. 60/728,103, filed on Oct. 19, 2005.

(51) Int. Cl.
*B25B 23/142* (2006.01)
*G01L 5/24* (2006.01)

(52) U.S. Cl. .................................... 81/478; 73/862.22

(58) Field of Classification Search ........... 81/477–479; 73/862.22, 862.23, 862.26, 862.328
See application file for complete search history.

(56) References Cited

U.S. PATENT DOCUMENTS

| | | | | |
|---|---|---|---|---|
| 1,925,219 A | | 9/1933 | Weigt | |
| 2,007,880 A | | 7/1935 | Sharp | |
| 2,159,373 A | | 5/1939 | Dunn | |
| 2,250,941 A | | 7/1941 | Zimmerman | |
| 2,367,224 A | | 1/1945 | Larson et al. | |
| 3,076,362 A | * | 2/1963 | Able | 81/478 |
| 3,142,177 A | * | 7/1964 | Hanscom et al. | 73/862.23 |
| 3,274,827 A | | 9/1966 | Sturtevant | |
| 3,304,772 A | | 2/1967 | Campbell | |
| 3,525,256 A | | 8/1970 | Stasiek et al. | |
| 3,726,134 A | | 4/1973 | Grabovac | |
| 4,073,187 A | | 2/1978 | Avdeef | |
| 4,558,601 A | * | 12/1985 | Stasiek et al. | 73/862.23 |
| 4,664,001 A | | 5/1987 | Denman | |
| 4,665,756 A | | 5/1987 | Snyder | |
| 4,762,007 A | | 8/1988 | Gasperi et al. | |
| 4,805,464 A | | 2/1989 | Grabovac | |
| 6,070,506 A | * | 6/2000 | Becker | 81/479 |
| 6,109,150 A | * | 8/2000 | Saccomanno, III | 81/478 |
| 6,276,243 B1 | | 8/2001 | Jenkins | |

(Continued)

*Primary Examiner*—David B Thomas
(74) *Attorney, Agent, or Firm*—Marshall, Gerstein & Borun LLP

(57) ABSTRACT

A torque wrench includes a main beam having a distal end and a proximal end, a drive element disposed at the distal end of the main beam, a stationary beam having a distal end fixedly secured to the main beam at a first location on the main beam, and having a proximal end, and a displacement sensor assembly disposed at a second location associated with the main beam and with the stationary beam to detect an amount of displacement of the main beam relative to the stationary beam. The displacement sensor assembly includes an actuating element to produce a radiation signal and rigidly secured to one of the main beam or the stationary beam and an actuable element responsive to the radiation signal and rigidly secured to the other one of the main beam or the stationary beam.

21 Claims, 8 Drawing Sheets

U.S. PATENT DOCUMENTS 6,463,811 B1 10/2002 Putney
7,082,865 B2 8/2006 Reynertson, Jr.
7,089,834 B2 8/2006 Reynertson et al.
7,367,250 B2 * 5/2008 Rainone et al. ............... 81/478

* cited by examiner

DIGITAL BEAM TORQUE WRENCH

RELATED APPLICATION DATA

This application is a continuation of the U.S. patent application Ser. No. 11/500,064, filed on Aug. 7, 2006, which application being hereby incorporated by reference herein in its entirety, and which claims priority to provisional U.S. Patent Application Ser. No. 60/728,103, filed on Oct. 19, 2005, also hereby incorporated by reference herein in its entirety.

FIELD OF THE INVENTION

The present invention relates generally to manual hand tools, and more particularly to a wrench for application of a controlled and/or measured amount of torque to threaded items such as bolts.

BACKGROUND OF THE INVENTION

The torque wrench has been a staple of the mechanic's tool chest for perhaps a hundred years or more. As would be familiar to those of ordinary skill, a torque wrench is a wrench used to precisely set the torque of a threaded fastening item such as a nut or a bolt. Torque wrenches are used where the tightness of fasteners is crucial, allowing the operator to measure and/or control the amount of torque applied to the fastening device so that it can be matched to specifications.

The application, measurement and retention of information relative to the torque applied to various mechanical items becomes increasingly important for increasingly complex mechanical devices and systems. Accurate, precise and controlled application of torsion force (torque) is increasingly required for many applications involving safety considerations as well as regulatory, investigative, and production process tracking and audit trails, in addition to merely ensuring that a system whose reliable operation depends upon correct application of torsional force to its components. Further, the range of environments in which torque wrenches are used varies widely, and influences the ability of the tool operator to reliably and repeatedly apply torque to a system.

A common type of torque wrench is referred to as a "beam-type" torque wrench. In general, a beam-type torque wrench comprises an elongate lever arm (beam) having a handle on a proximal end and a wrench head (socket) at a distal end for engaging an item to which torsional force is applied. The beam is made of a material which will flex elastically along its length under applied force. A second, smaller bar carrying an indicator is connected to the distal end of the beam and extends substantially in parallel with the beam toward the proximal end. The proximal end of the second arm is not secured to the main beam, and hence is not subjected to strain and remains straight during use of the wrench. A calibrated scale is fitted to the handle in proximity to the proximal end of the second arm. The bending of the main beam under application of force causes the scale to move under the proximal end of the second arm. When the desired indicated torque is reached, the operator stops applying force.

Reading the displacement of the beam, which is the measure of the amount of torque applied, is the most important feature of the digital beam torque wrench. The repeatability of the displacement of the standard beam type torque wrench has been established. The beam torque wrench has the ability to be more accurate and repeatable than other conventional and/or more expensive torque wrench technology. However, a potential problem with existing beam type torque wrenches lies in the difficulty of the human eye in discriminating the rather limited displacement of the beam relative to the indicator.

It is believed, therefore, that there remains a need for a torque wrench that can be efficiently read with a high degree of accuracy. Moreover, there is an increasing need for torque wrenches having additional functional capabilities, such as providing additional forms of readout (for example, visual, and/or audible), and/or providing a means for recording, storing, and perhaps transmitting measured torque values.

SUMMARY

In view of the foregoing, the present invention is directed to a torque wrench system which incorporates three main functional components: first, a means for accurate measurement of beam displacement; second, a user interface for communicating torque values to the operator; and third, an electronic system for storage and retrieval of torque values.

In one embodiment of the invention, a torque wrench is provided having a displacement sensing assembly for highly accurate measurement of beam displacement, a first electronic subsystem for conversion of beam displacement measurements to torque values, and a second electronic subsystem for acquiring, storing, and communicating torque values.

In one embodiment, a torque wrench is provided which utilizes a rack-and-pinion potentiometer assembly at the proximal end of the main beam of the wrench. Displacement of the beam during application of torsion force rotates the potentiometer, which in turn modulates an analog voltage whose magnitude thus correlates to the degree of displacement of the beam, and hence to the amount of torque applied. The sensor voltage is supplied to an electronics system for conversion to a digital torque value.

In accordance with one aspect of the invention, an interface is provided for measuring, reporting, and storing sensed torque values. In various embodiments, the interface may involve voice chips for audible annunciation of readout values, buzzers, speakers, and/or digital displays. The electronics associated with the torque sensing and interface functions may be implemented using microprocessors or application-specific integrated circuits, preferably powered by batteries, and may further include memory for storage of torque readout values, and a transmission system for reporting torque readout values to a remote transceiver.

In accordance with another aspect of the invention, the components of the digital beam torque wrench preferably are enclosed within a rugged, light weight, ergonomically sensitive, element resistive housing. Preferably, the wrench is designed to permit easy reading, easy setup, and easy access for applications.

BRIEF DESCRIPTION OF THE DRAWINGS

The foregoing and other features and aspects of the present invention will be best appreciated by reference to a detailed description of the specific embodiments of the invention, when read in conjunction with the accompanying drawings, wherein.

DETAILED DESCRIPTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such a development effort might be complex and time-consuming, but would nevertheless be a routine undertaking for those of ordinary skill in the relevant fields.

Figure 1:
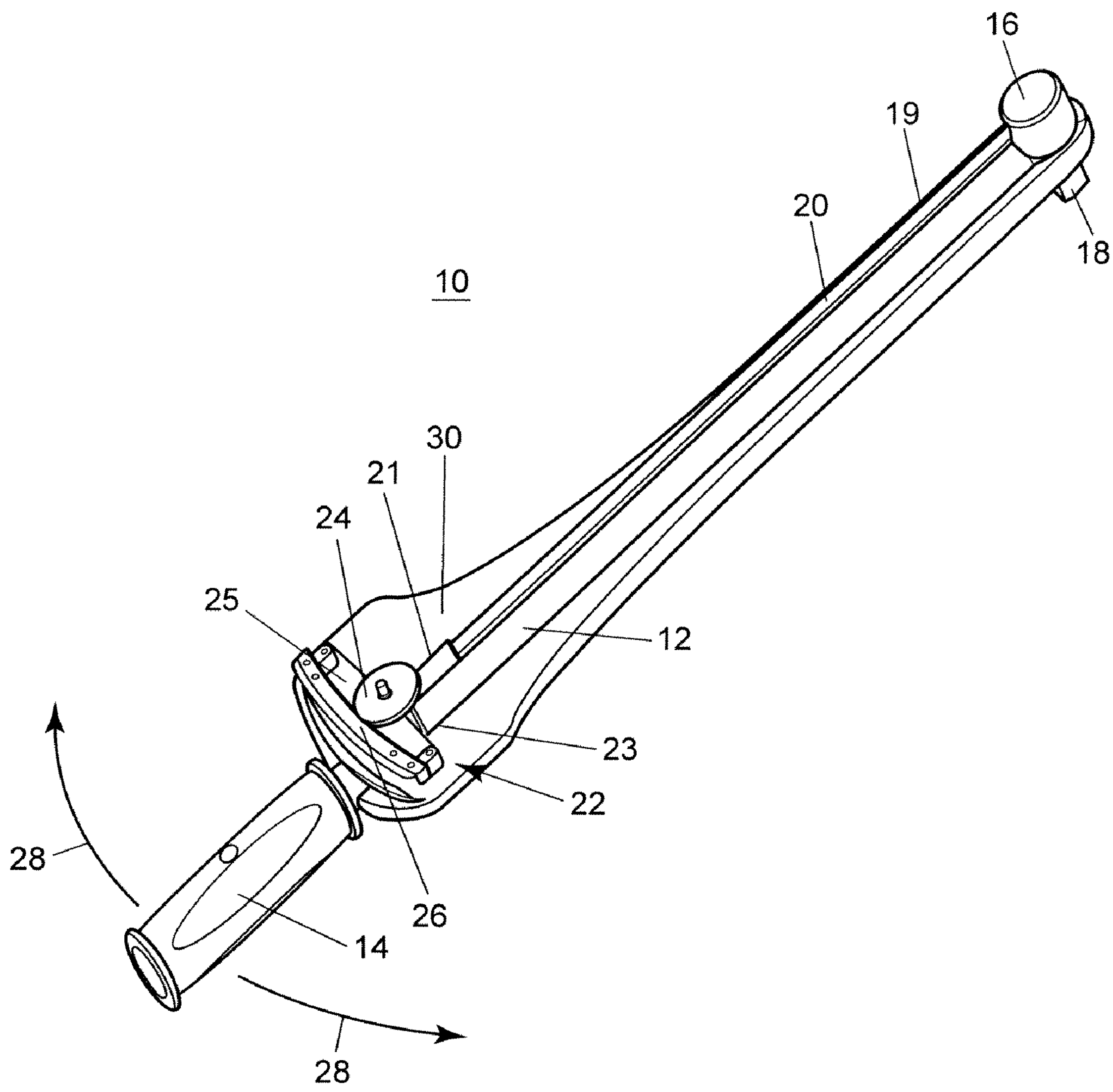
FIG. 1 is a perspective view of a torque wrench system in accordance with one embodiment of the invention with an upper half of the housing thereof removed to expose the various operational components thereof.

Referring to FIG. 1, there is shown a digital beam torque wrench 10 in accordance with one embodiment of the invention. As shown in FIG. 1, wrench 10 comprises a main beam 12 having a handle or grip assembly 14 on a proximal end 23 thereof, and a distal end 16. As would be apparent to those of ordinary skill in the art, a socket drive 18 typically including a socket square for exchangeably securing sockets of various sizes (not shown) is disposed on distal end 16 of main beam 12. Socket drive 18 may be of a fixed or ratcheting type, as would be apparent to those of ordinary skill in the art.

Grip assembly 14 is used to facilitate convenient and functional movement of the digital beam torque wrench 10. The handle 14 is also designed to ensure that the operator applies the force at the correct location. In one embodiment of the invention, grip assembly 14 comprises a grip handle consisting of a formed material suitable for conforming to manual human hand gripping and operationally manipulating wrench 10 before, during and after application of torsional force.

In a highly upfeatured embodiment of the invention (i.e., one incorporating certain elements which might not be necessary or appropriate in all cases), the gripping handle component includes an automated attachment assembly for use in remotely operated torsional force application environments and settings.

With continued reference to FIG. 1, wrench 10 further comprises an elongate stationary beam 20 having a distal end 19 and proximal end 21. In a preferred embodiment, distal end 19 is fixedly secured or attached substantially at or near distal end 16 of main beam 12. As is apparent from FIG. 2, elongate stationary beam 20 extends substantially in parallel to the elongate body of main beam 12. Stationary beam 20 is carried though attachment at its distal end 19 to main beam 12, its proximal end 21 being uncoupled from main beam 12 (as used herein, the term "uncoupled" it intended to refer to an arrangement whereby the proximal end 21 of stationary beam 20 is not rigidly secured to main beam 12, although, as will be hereinafter described, there may be some mechanical contact between the proximal end 21 of stationary beam and main beam 12, although such contact does not restrict movement of main beam 12 relative to the proximal end of 21, as will hereinafter become apparent.)

In the presently preferred embodiment, a beam displacement sensor assembly 22 is disposed substantially at or near proximal end 23 of said main beam 12. Sensor assembly 22 functions to provide an indication of relative movement of main beam 12 relative to stationary beam 20. A notable consequence of such an arrangement is that flexure of main beam 12 upon application of force to proximal end 23 of main beam 12 causes deflection of main beam 12 along its length, while stationary beam remains unmoved.

Stationary beam 20 is able to, in general terms, reveal (sense) the degree of deflection of main beam 12 along its length when force applied to grip assembly 14 is sufficient to cause such deflection of main beam 12, such that a measurable and discemable amount of torque is being exerted by wrench 10 at distal end 16 of main beam 12.

It is contemplated that various beam displacement sensing mechanisms 22 can be applied in the practice of the present invention. By way of illustration only, in the embodiment of FIG. 1, beam displacement sensing assembly 22 comprises a rack-and-pinion rotary position sensor 25 including an actuable element 24 and an actuating element 26. In the embodiment of FIG. 1, actuable element 24 comprises a pinion gear coupled to the axis of a potentiometer. It is to be noted that in FIG. 1, an upper portion of an outer protective housing 30 is not shown, so as to expose to view the various functional components of wrench 10. In a preferred embodiment, operational housing 30 is formed of a suitably high strength material, such as, for example, plastic, metal, ceramic, which may be, as necessary, chemically resistive, crush resistive, light weight, and conformally shaped. In a downfeatured embodiment of the invention, housing 30 may be partially or completely omitted so as to allow use in low cost, environmentally friendly torsional force application environments.

A position sensor actuating element 26 is affixed to proximal end 23 of main beam 12. In the embodiment shown in FIG. 1, position sensor actuating element 26 comprises an arcuate rack gear 26 affixed to the proximal end 23 of main beam 12 and positioned so as cooperatively engage pinion gear 24 of sensor assembly 22. That is, position sensor actuator 26 is in cooperative disposition with respect to actuable element 24, such that relative movement between actuating element 26 and actuable element 24 can be detected, as is hereinafter described.

As will be appreciated by those of ordinary skill in the art having the benefit of the present disclosure, wrench 10 is utilized to apply measured torsional forces to fastening elements such as bolts, nuts, and the like. Operation of the wrench involves application of force on grip assembly 14 in the direction indicated by either one of arrows 28 in FIG. 1. As more and more torque through application of force upon grip assembly 14 is exerted on a fastening element via a socket (not shown) engaged in socket drive 18, main beam 12 will undergo a gradually increasing degree of flexure along its length, such that arcuate rack gear (actuating element) 26, which is in fixed contact with a generally distal end of beam 12, moves laterally with respect to the proximal end 21 of stationary beam 20. Any movement of rack gear (actuating element) 26 resulting from flexure of beam 12 in turn, causes a corresponding degree of rotation of pinion gear (actuable element) 24, owing to the engagement of the teeth of pinion gear 24 with the teeth of rack gear 26.

In the merely illustrative embodiment of FIG. 1, beam displacement sensing assembly 25 comprises a potentiometric rotary position sensor 22, many examples of which being well known to those of ordinary skill in the art and commercially available from many manufacturers. Such sensors translate rotary movement into an analog voltage which varies proportionally with the extent of rotary movement. When coupled to pinion gear 24, therefore, beam displacement sensing assembly 25 generates a signal corresponding to the extent of rotation of pinion gear 24 caused by flexure of main beam 12. Since a given torsion force will result in a known degree of deflection of main beam 12, the output signal from position sensor assembly 25 will proportionally correlate with applied torsional force.

In an alternative embodiment of the invention, it is contemplated that multiple rotational sensors may be incorporated into the digital beam torque wrench to accommodate dynamic torsional force application to systems which do not have a static torsional force characteristic. Multiple sensors would be used to differentiate, profile, characterize, and interpret multiple signals for accurate application of force in non-constant torsional force application and feedback settings.

In accordance with a notable aspect of the invention, wrench 10 includes an electronics package (not shown in FIG. 1) enabling wrench 10 to perform various functions as shall hereinafter described. It is contemplated that the electronics associated with wrench 10 may be advantageously enclosed within handle assembly 14 or proximate to sensor assembly 22 within housing 30, or both. The exact location(s) of the electronics is regarded as a mere decision and is not believed to be of particular relevance to the present invention. In addition, the details concerning implementation of the electronics package are not believed to be described herein except in functional terms. It is believed that persons of ordinary skill in the art having the benefit of the present disclosure would be readily able to implement the electronic system(s) necessary to achieve the functionality described herein. Such electronic system(s) may be implemented using a general purpose microprocessor or the like, or using application-specific integrated circuits, as would be familiar to those of ordinary skill. Furthermore, such features that require transmission of data and command to and from wrench 10 can be implemented using any of a wide variety of remote transceiver devices and technologies.

Figure 2:
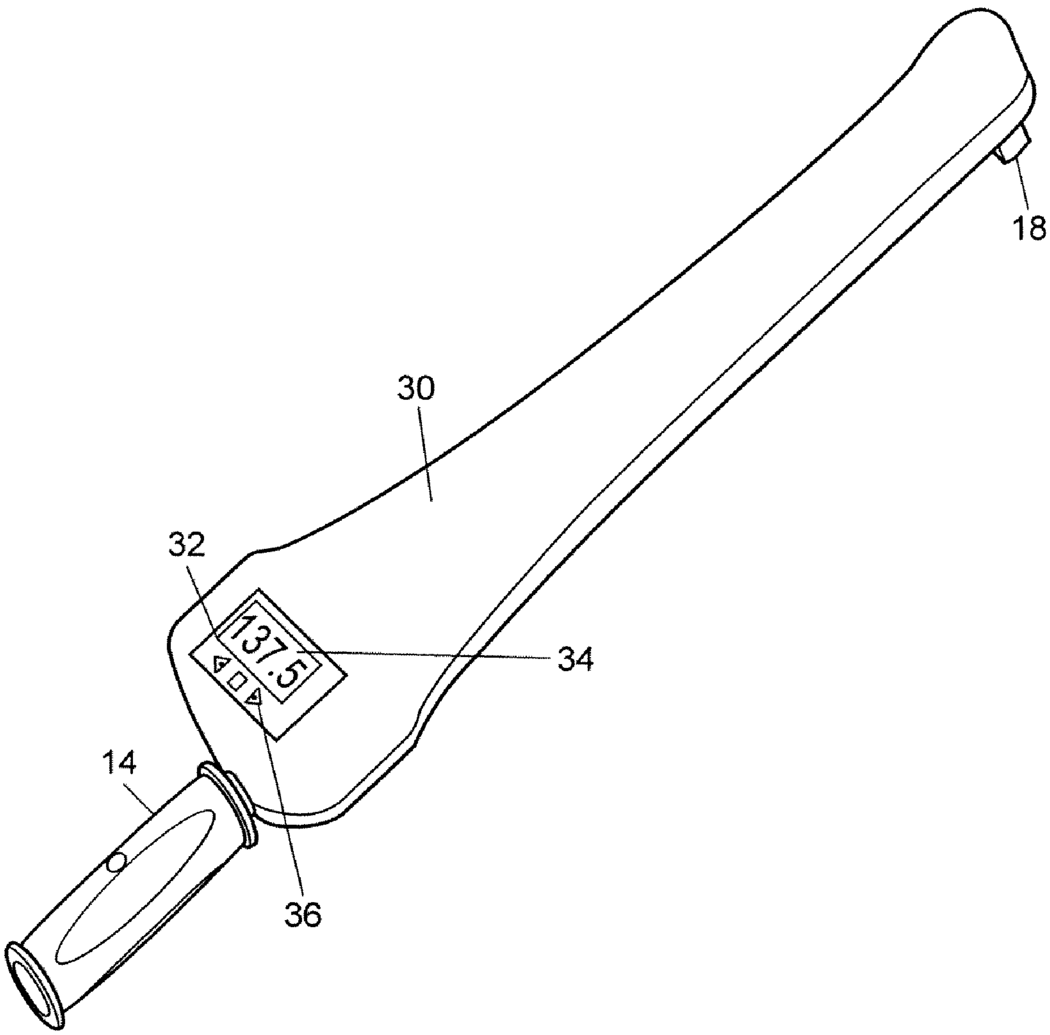
FIG. 2 is a perspective view of the wrench of FIG. 1 with its housing.
Figure 3A:
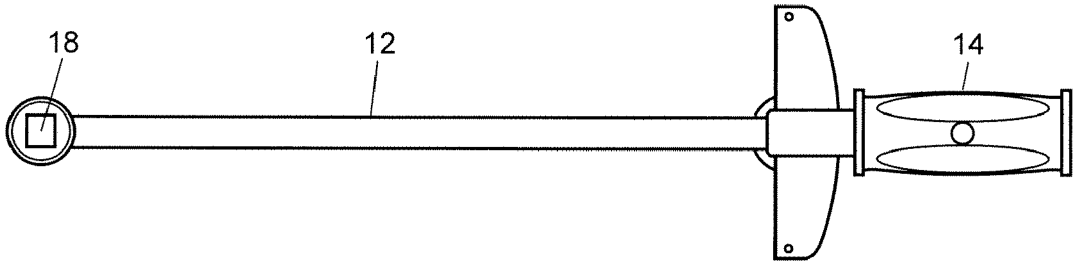
FIGS. 3*a*, 3*b*, 3*c*, 3*d*, and 3*e* are bottom, side, top, proximal end, and distal end views, respectively, of the wrench from FIG. 1, with the housing removed to expose operational components thereof.
Figure 3B:
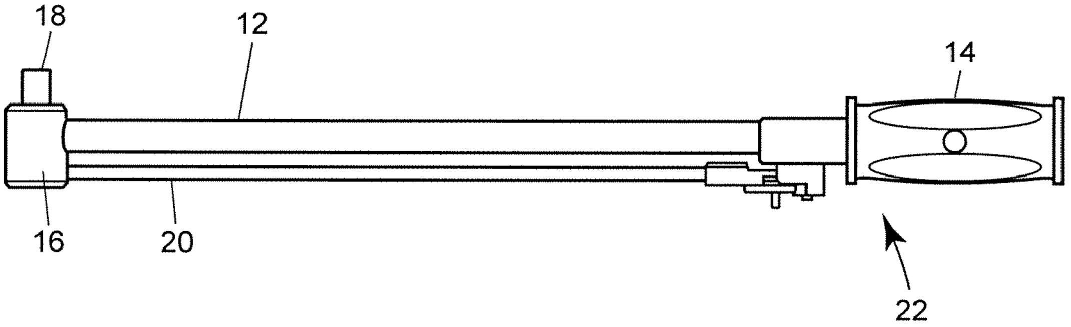
Figure 3C:
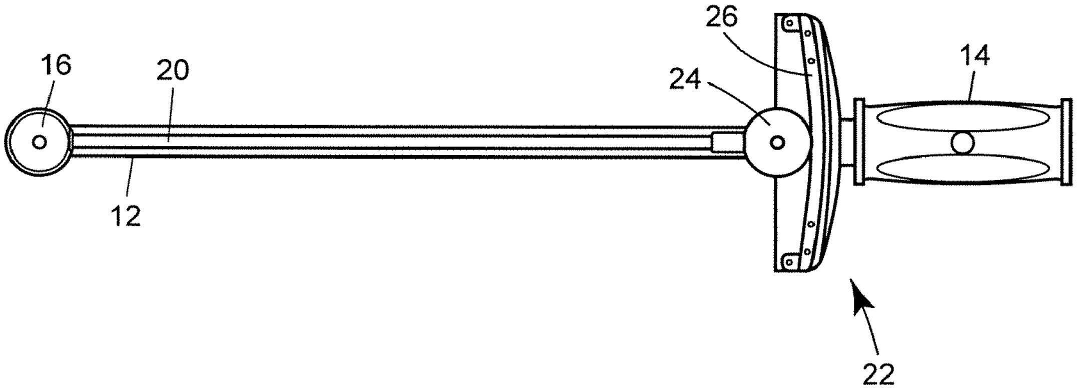
Figure 3E:
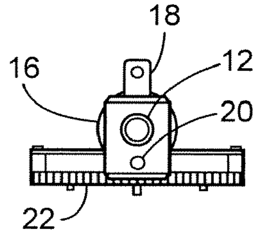
Figure 3D:
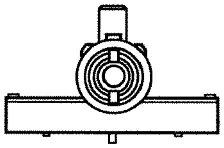
Figure 4A:
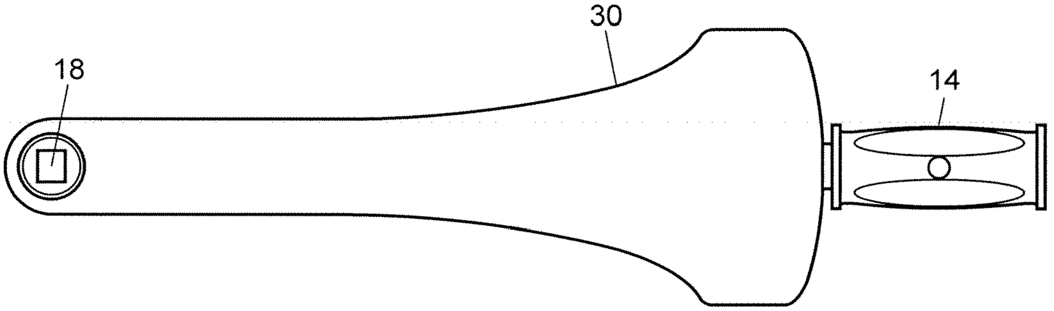
FIGS. 4*a*, 4*b*, 4*c*, 4*d*, and 4*e* are bottom, side, top, proximal end, and distal end views, respectively, of the wrench from FIG. 1, showing the housing and illustrating placement of a digital readout on an upper surface of the housing.
Figure 4B:
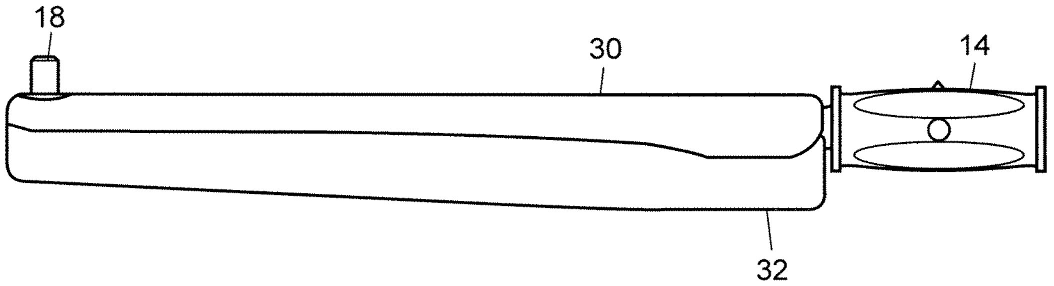
Figure 4C:
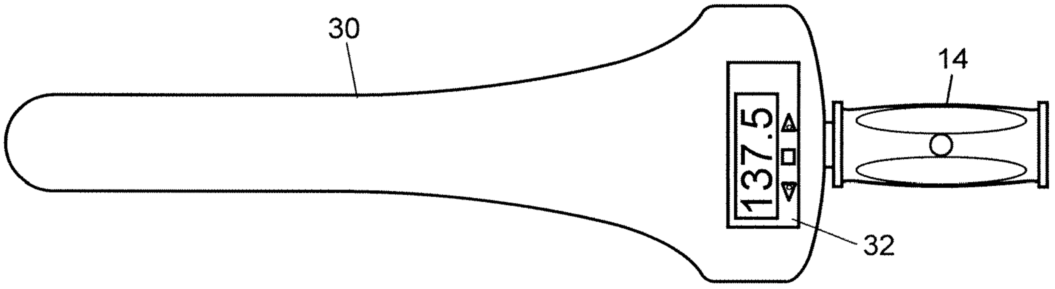
Figure 4E:
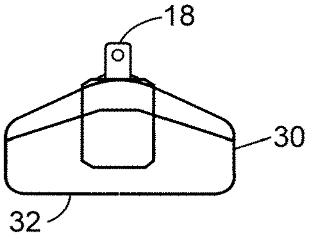
Figure 4D:
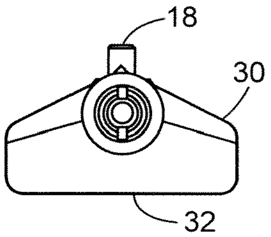

Operation and control of the digital beam torque wrench is accomplished using singularly, or in combination, a series of one or more buttons or human finger touch pads. Referring to FIG. 2, there is shown a perspective view of wrench 10 including its entire housing 30. As shown in FIG. 2, housing 30 carries a control and display module 32 which includes, in the presently disclosed embodiment, a digital readout 34 and one or more user-actuable buttons or switches 36.

In a highly upfeatured embodiment of the invention, the control/selection buttons 36 and pads would be replaced, bypassed or enhanced through an electronic wireless communication module that would enable two-way communication of information and control comments to/from the digital beam torque wrench and a remote control interface unit.

The electronics associated with wrench 10 function to receive, format, filter, mathematically manipulate, scale, and otherwise convert the data and information from the one or more rotational displacement position sensors 22 into applied torsional force information. Additionally, the electronics enables wrench 10 to sense its operational environment and receive inputs from user interfaces, either physically local to wrench 10 or remotely transmitted to wrench 10, thereby allowing for selection and control of modes of operation, as well as application of data ranges and type selection criteria for proper operation of the invention.

In embodiments which include audio feedback functions, audible annunciation of various degrees of closeness before or after a torque set point would be provided in fixed or adjustable degrees of volume to human operators. In embodiments which include visual feedback functions, differing colors, brightness, singular or multiple, simultaneous or sequential lights or alpha-numeric or a combination are used to feedback, notify, warn, alert, confirm, identify the operating state of the digital beam torque wrench.

It is contemplated that various embodiments of the invention may provide for the continuous retention of data relating to torsional forces applied by wrench 10. The torsion values may be recorded in a local memory 56 within housing 30 for later transmission or transfer to a remote device. The retained data may relate to torsion before, during and after the application of the invention to operational systems and environments. A manual and/or electronic selection process for starting, stopping, recording, resetting, erasing or controlling other data storage manipulation functions can be accomplished using control buttons 36.

Wrench 10 further functions in one embodiment to provide a means for retrieving, uploading, modifying and otherwise transporting operational and control information to or from the wrench 10 before, during or after operational use.

In a highly "upfeatured" embodiment, an electronic wired or wireless communication transceiver enables transport of actual torsional force application profiles from the wrench 10 to a remote data acquisition system. In a separate or combined "upfeatured" embodiment, an electronic wired or wireless communication link 64, to be described hereinafter in further detail, enables transport of planned torsional force application data profiles to the digital beam torque wrench from a remote data command and control system for application of torsional force by an automated, non-human operating environment.

As would be apparent to those of ordinary skill in the art, electronics associated with wrench 10 requires a source of electrical energy, which may be, for example, one or more internal, rechargeable or user-replaceable batteries. In one embodiment, it is contemplated that the electronics of wrench 10 may include circuitry for monitoring and/or managing power. For example, a warning alarm (either audible or visual) may be activated to notify the user of battery depletion or near-depletion. It will further be understood that varying embodiments of the invention may require one or more types and amounts of electrical energy to carry out the various functions described herein. In a highly "defeatured" embodiment, a simple portable, self-contained, disposable, replaceable or otherwise changeable battery is incorporated.

In highly "upfeatured" embodiments of the invention, more powerful, larger, longer lasting or otherwise scalable power sources and methods can be incorporated, such as but not limited to, larger batteries, replaceable, rechargeable batteries and associated recharge electronics (internal and external to the digital beam torque wrench itself, and even direct power supply connection configurations.

Figure 5:
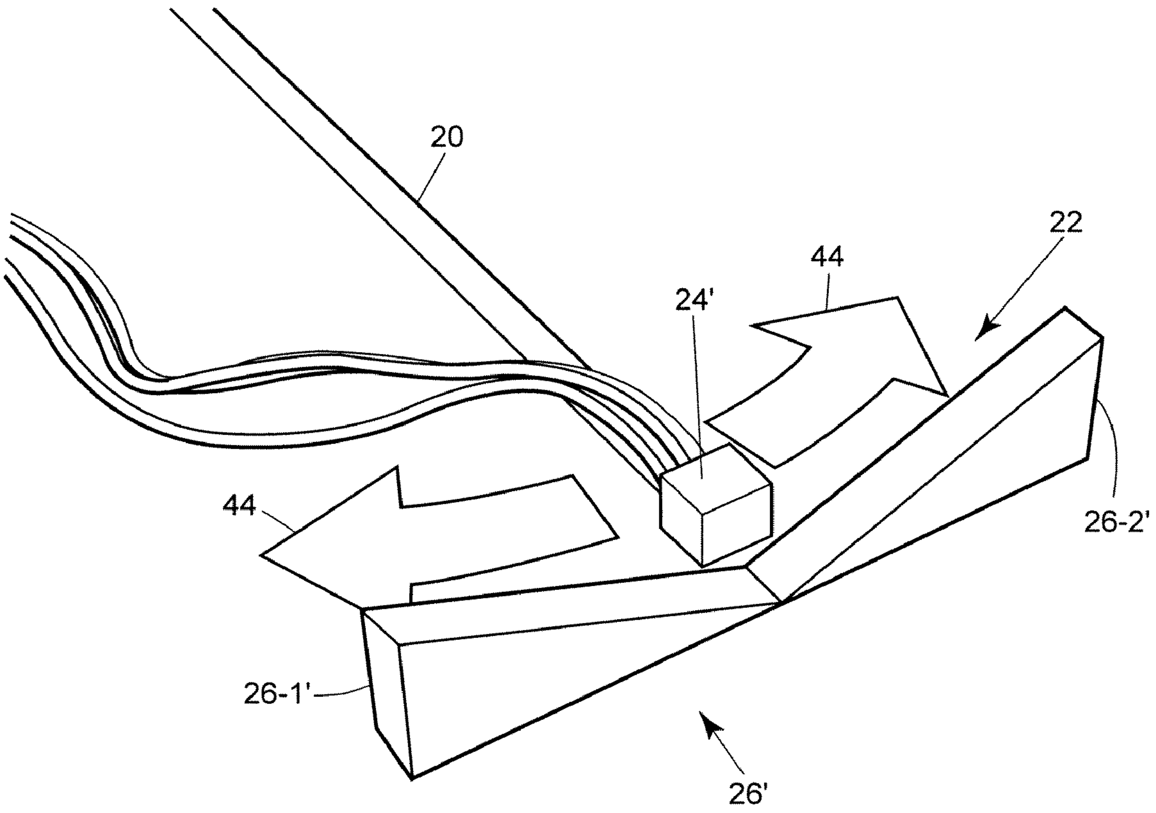
FIG. 5 is a schematic perspective view of a digital beam torque wrench in accordance with an alternative embodiment of the invention employing an alternative beam displacement sensing system.

Referring to FIG. 5, there is shown a schematic representation of a wrench 10' in accordance with an alternative embodiment of the invention incorporating an alternative beam displacement sensing assembly 22'. Sensing assembly 22' is contemplated to be among the various suitable substitutes for the illustrative assembly 22 described above with reference primarily to FIG. 1. In particular, as represented in FIG. 5, a sensing assembly 22' including an actuable element 24' in the form of a ratiometric Hall Effect sensor 24' and corresponding in general functional terms with actuable element 24 in the embodiment of FIG. 1 is provided. As shown in FIG. 5, such a scheme is further implemented by providing an actuating element 26' in the form of a magnetic structure 26' and corresponding in general functional terms with actuating element 26 in the embodiment of FIG. 1.

Actuating element 26' in FIG. 5, like actuating element 26 in the embodiment of FIG. 1, is rigidly attached to a main beam 12 (for clarity, not shown in FIG. 5), and situated proximal to and in cooperation with actuable element (ratiometric Hall effect sensor) 24' that is supported by the proximal end 21 of stationary beam 20.

Those of ordinary skill in the art will appreciate from FIG. 5 that any flexure of main beam 12 will cause displacement of magnetic structure 26' relative to sensor 24', which remains stationary.

In the embodiment represented schematically in FIG. 5, magnetic structure 26' has a profile which varies laterally along its lateral length. In particular, in the embodiment of FIG. 5, magnetic structure 26' has a profile which varies from a minimum height in the center thereof to maximum heights at either of its extremities (26-1' and 26-2'). This configuration causes Hall Effect sensor 24' to detect a magnetic field that changes with increasing displacement of main beam 12 toward either extremity 26-1' or 26-2' (i.e., in the direction of either arrow 44 in FIG. 5). The output of the Hall Effect sensor 24' thus varies in proportion to the extent of displacement, and hence to the amount of torque being applied by the wrench. Ratiometric Hall effect sensors suitable for the purposes of practicing the present invention as described herein are well-known and commercially available from many sources.

Figure 6:
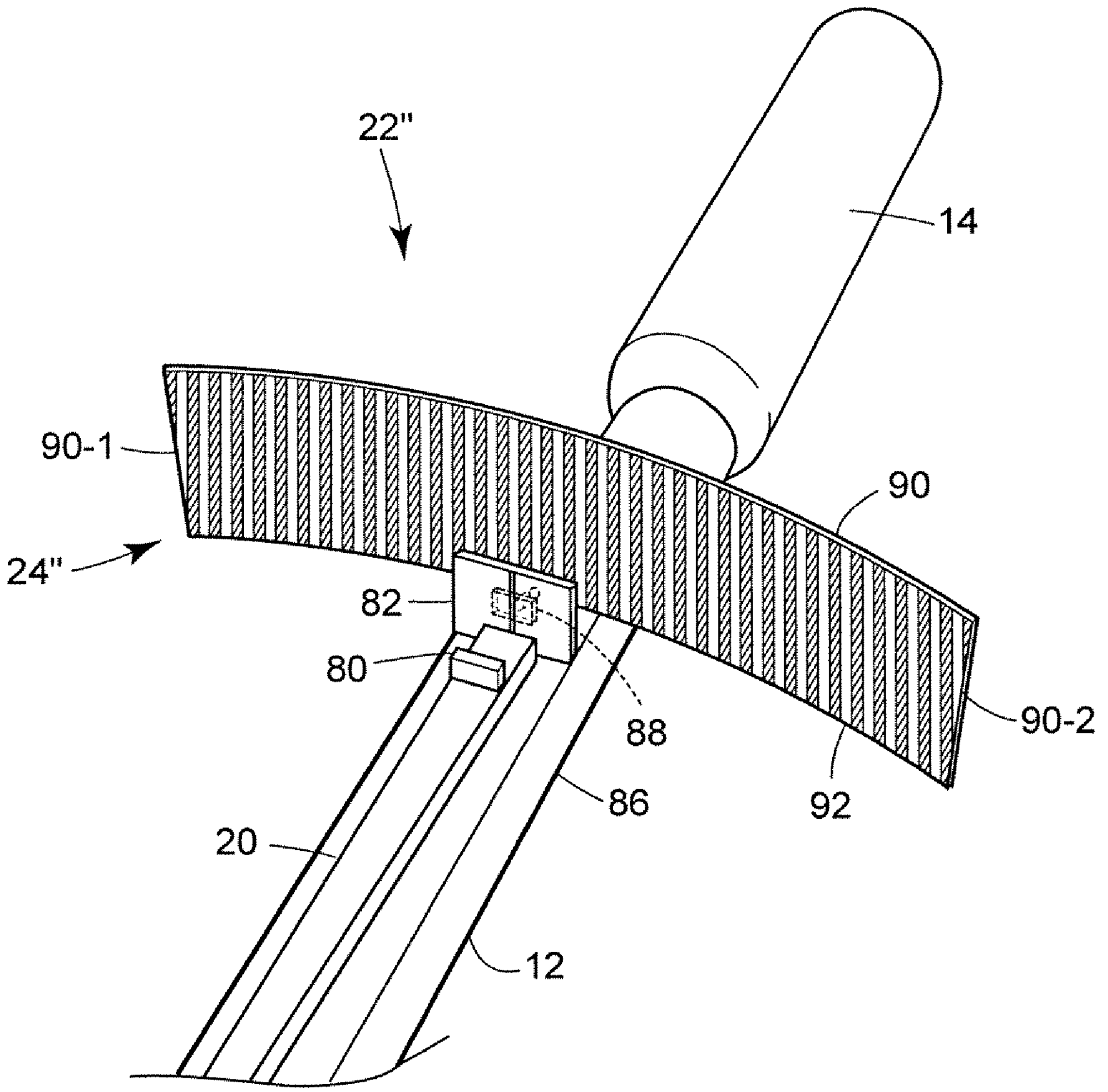
FIG. 6 is a schematic perspective view of a digital beam torque wrench in accordance with an alternative embodiment of the invention employing another alternative beam displacement sensing system.

Turning now to FIG. 6, there is shown a representation of a wrench 10" in accordance with another alternative embodiment of the invention, incorporating an alternative beam displacement sensing assembly 22". Sensing assembly 22" in FIG. 6 is contemplated to be yet another of the various suitable substitutes for the illustrative assembly 22 described above with reference primarily to FIG. 1, and in the other alternative embodiment described above with reference primarily to FIG. 5.

In particular, and as shown in FIG. 6, a sensing assembly 22" is provided, including an actuable element in the form of an optical photodiode 80, along with an associated aperture plate 82 and a radiation source 88, this combination corresponding in general functional terms with actuable element 24 in the embodiment of FIG. 1. Photodiode 80 is disposed at or near the proximal end 21 of stationary beam 20, and aperture plate 82 is mounted proximally in front of photodiode 80 so as to guide radiation impinging upon photodiode 80 to a restricted lateral dimension. The restricted lateral dimension is established by the width of a slit 86 in aperture plate 82.

As shown in FIG. 6, sensing assembly 22" further comprises an actuating element in the form of an indexed register 90 rigidly affixed to main beam 12, the indexed register 90 corresponding in general functional terms with actuating element 26 in the embodiment of FIG. 1, and having lateral extremities designated with reference numerals 90-1 and 90-2 in FIG. 6.

In the embodiment of FIG. 6, the actuating element (consisting of indexed register 90) is situated proximal to and in functional cooperation with the photodiode 80, which is carried on the proximal end 21 of displacement beam 20. Actuating element 90 in the embodiment of FIG. 6 comprises a preferably arcuate planar surface having a plurality of contrasting, spaced-apart index marks, an exemplary one of such plurality of index marks being identified with reference numeral 92 in FIG. 6.

In the embodiment of FIG. 6, it is contemplated that radiation source 84 may consist of a light-emitting diode (LED), many different species of which being widely known and commercially available from any number of suppliers.

Those of ordinary skill in the art will appreciate from FIG. 6 that any flexure of main beam 12 will cause a corresponding lateral displacement of mask 80 (rigidly affixed to main beam 12) relative to actuable element (photodiode) 24", which by virtue of being disposed on or near the proximal end 21 of stationary beam 20, remains stationary.

In the embodiment represented in FIG. 6, the plurality of vertical index markings 92 on indexed register 90 tend to modulate the intensity of radiation (light) reflected off of register 90 as may be directed to register 90 by radiation source 84. This arrangement causes a modulation of radiation reflected off of index register 90 and subsequently detected by photodiode 82.

Figure 6A:
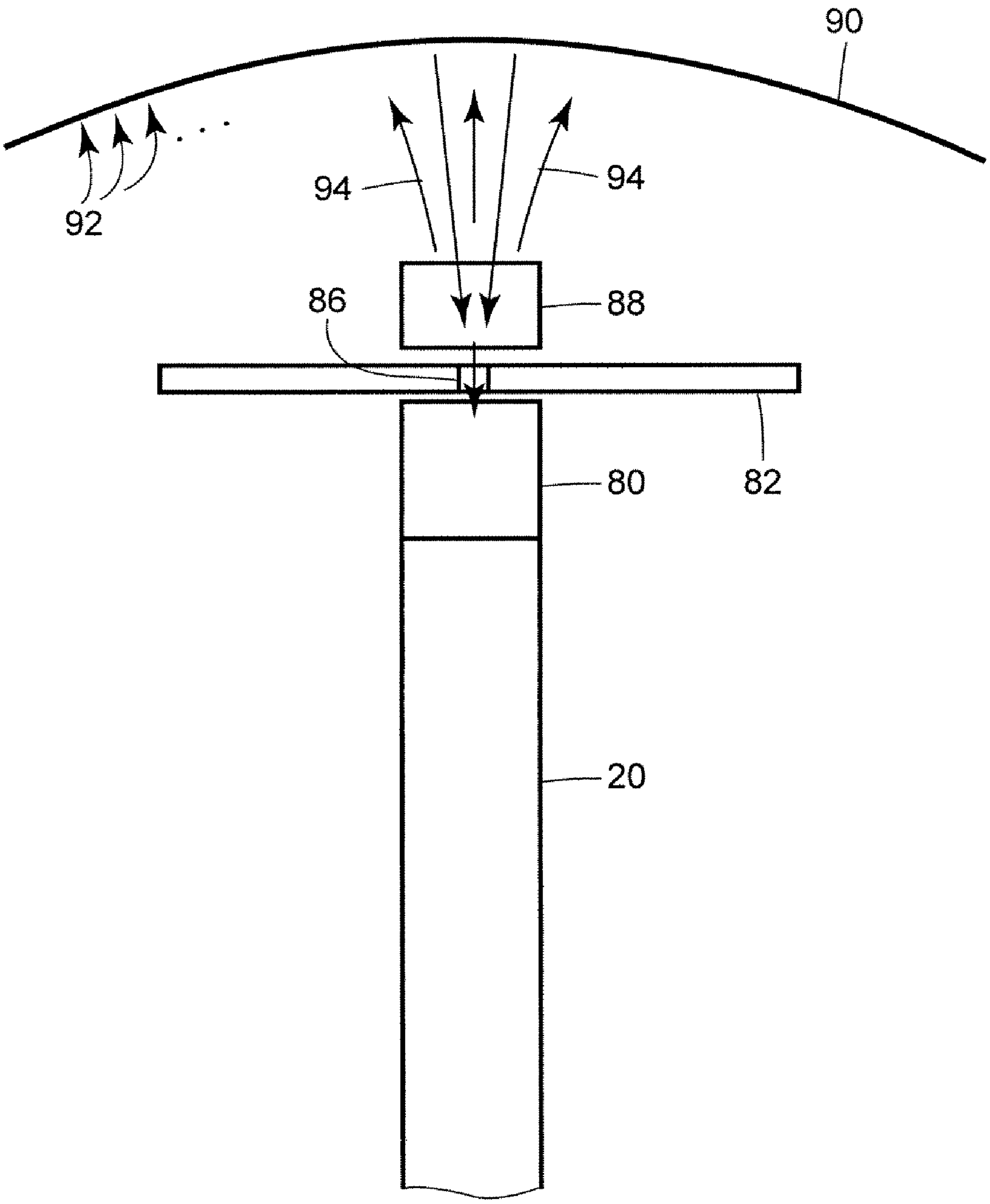
FIG. 6A is a top view of the digital beam torque wrench of FIG. 6.

Turning to FIG. 6*a*, those of ordinary skill in the art will appreciate that the slit 86 in aperture plate 82 functions to define the lateral extent of radiation reflected off of index register 90 such that radiation from radiation source 88 (represented by arrows 94 in FIG. 6*a*) is intermittently reflected or absorbed by index register 90, depending upon the position of index register 90 relative to photodiode 88. This position of index register 90 is, in turn, dependent upon the degree of flexure of main beam 12 (not shown in FIG. 12), to which index register 90 is affixed.

In a preferred embodiment, slit 86 in aperture plate 82 is a vertically elongate slit of width on the order of 0.03 mm. Likewise, vertical index markings 92 on index register 90 have a width on the order of 0.03 mm, with interstitial gaps of comparable width. Those of ordinary skill in the art will appreciate that the width of slit 86 and of markings 92, the relationship between such widths, as well as the widths of interstitial gaps between markings 92 may be varied from implementation to implementation depending upon a number of factors, including, for example the desired maximum precision of torque measurement of the wrench, as well as the resolution of photodiode 80.

The structural relationship of photodiode 80, aperture plate 82 and slit 86, and index register 90 results in the actuable element (photodiode) 24" being capable of detect pulses of radiation (light) according to the displacement of main beam 12 relative to slit 86 in aperture plate 82. The output of the actuable element (photodiode) 24" consequently provides a stream of pulses reflecting the relative movement of main beam 12 and stationary beam 20, and hence to the amount of torque being applied by the wrench 10".

Photodiodes suitable for the purposes of practicing the present invention as described herein are well-known and commercially available from many sources, as are complementary radiation sources whose emissions are detectable by such photodiodes.

Figure 7:
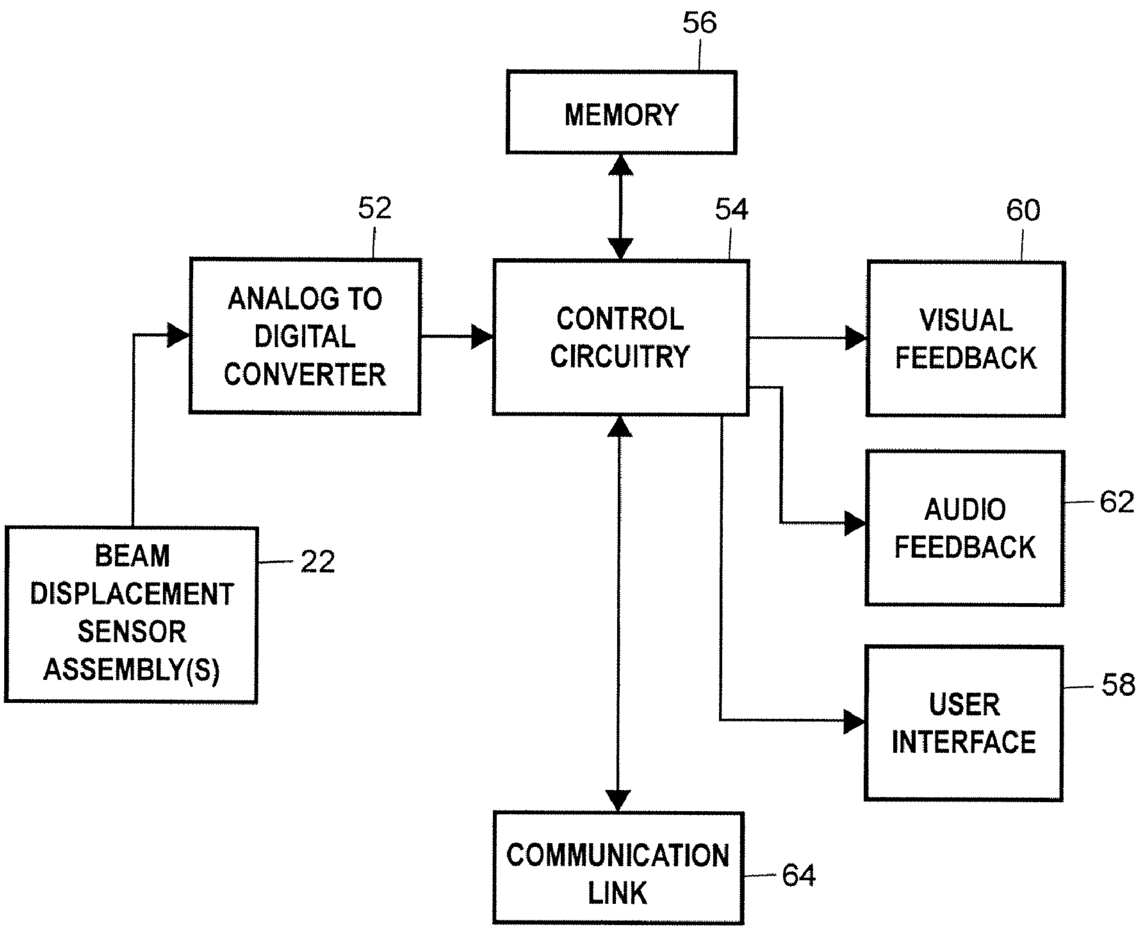
FIG. 7 is a functional block diagram of electronic circuitry incorporated into a digital beam torque wrench in accordance with any one of a variety of embodiments of the invention.

Referring to FIG. 7, there is shown a functional block diagram of an electronics system incorporated into a torque wrench such as torque wrench 10 in accordance with an exemplary embodiment of the invention. It is to be understood that the implementation of electronic systems illustrated in FIG. 7 corresponds to a relatively full-featured (up-featured) implementation of the invention, and those of ordinary skill in the art having the benefit of the present disclosure will appreciate that the invention may be practiced in a form encompassing fewer or greater functional capabilities than depicted and described with reference to FIG. 7.

Any embodiment of the invention can be assumed to incorporate a beam a displacement sensor assembly 22 capable of sensing with a necessary degree of precision and accuracy, the extent of deflection of main beam 12 as a result of the exertion of force upon grip assembly 14. In some contemplated embodiments, the sensing of deflection by assembly 22 manifests itself as an analog voltage whose level correlates to the degree of deflection.

As shown in FIG. 7, the output from beam displacement sensor assembly 22 in the illustrative embodiment is applied to an analog-to-digital (A/D) converter 52, which, as would be understood by those of ordinary skill in the art, generates digital (customarily binary) signals corresponding to the level of the output voltage from sensor assembly 22. A/D converters suitable for the purposes of the present invention are widely used in the art and available in many suitable forms from many commercial suppliers.

The digital output from A/D converter 52 is, in the illustrative embodiment, provided to control circuitry 54. As previously mentioned, and as would be fully appreciated by those of ordinary skill in the art, control circuitry 54 may be implemented in various ways, such as in the form of a semiconductor microprocessor, of which countless examples are known and available to those of ordinary skill in the art, or, alternatively, using customized application-specific integrated circuit modules (ASICs), which are likewise well-known and commonly employed by persons of ordinary skill in the art to achieve the functionality of the device as described herein.

Preferably, control circuitry 54 has associated therewith a suitable capacity of digital memory 56, such as may be implemented using any of the known semiconductor memory technologies familiar to persons of ordinary skill in the art (DRAMs, SDRAMs, etc . . . ).

In a preferred embodiment, control circuitry 54 is capable of reception of digital values from A/D converter 52 in real time, either synchronously or asynchronously, and processing this input data as necessary to achieve the functionality as described herein.

In one embodiment, torque values are received by control circuitry 54 on a continuous basis over controlled intervals, which may be specified, for example by the operator of wrench 10 through user interface 58, as shall be hereinafter described. In any case, in one embodiment, one or more torque measurement values are periodically or continuously stored in memory 56 for later retrieval and/or processing.

In an illustrative embodiment, torque measurement values originating from the analog voltage signals produced by beam displacement sensor assembly 22 are periodically, or on demand, communicated to the operator via one or more feedback means, including, without limitation, a visual feedback means and/or an audio feedback means. (Theoretically, although not specifically depicted in the Figures, wrench 10 may be further provided with the necessary haptic capabilities to provide sensory (tactile/vibrational/resistive) feedback to the user during operation of the device.)

In one embodiment, visual feedback means 60 comprises a simple segmented digital (e.g., LED or LCD) display, with the displayed numerals corresponding in real time to the amount of torque being applied at wrench end 16 as a result of the exertion of force to grip end 14.

In another embodiment, audio feedback may be provided as represented by block 62 in FIG. 6, alerting the operator, for example, when a threshold torque value has been reached.

In most preferred embodiments, a user interface 58 of some sort is provided. In a simple implementation, user interface 58 may comprise a limited number of user-actuable buttons carried by housing 30. The use of a limited number of user-actuable buttons to control various operational features of electronic devices is a well-proven and commonly employed concept familiar to anyone of ordinary skill in the art. A common example is the very popular and expansive range of digital timepieces available on a mass consumer basis.

On the other hand, user interface 58 could in more upfeatured embodiments comprise more sophisticated interface means, which would be no less familiar to anyone of ordinary skill in the art.

Finally, in some embodiments, it is desirable to incorporate an external communications link, as represented by block 64 in FIG. 6. As alluded to elsewhere in this disclosure, communications link 64 can take the form of a wireless telemetry link of which numerous examples are well-known in the art, or a hard-wired link, for example (but not by limitation) a serial port, a USB port, or the like. Communications link 64 is preferably capable of relaying data to control circuitry 54 concerning torque measurement limits, controls, threshold alarm settings, and so on, as would be readily appreciated by those of ordinary skill in the art.

Communications link 64 may further include transceivers for communication between device 10 and other, similar or related devices utilized in a common application or setting. As necessary, a device such as device 10 may be capable of receiving operational signals from other devices and processing such signals either to control its own operation or to ensure that corresponding information is relayed to still other compatibly communicative devices.

From the foregoing detailed description of the specific embodiments of the invention, it should be apparent that a digital beam torque wrench has been disclosed. Although various embodiments and features of the invention have been described herein, this has been done solely for the purposes of illustrating various features and aspects of the invention and is not intended to be limiting with respect to the scope of the invention as defined in the appended claims, which follow.

Indeed, the versatility and flexibility of the disclosed system and the manners in which it may be implemented are believed to be important features of the invention. In accordance with one aspect, the invention comprises a completely flexible digital beam torque wrench system that can be defeatured, or upfeatured to provide a wide range of torque application information, including but without limitation, for automobiles, aircraft, outer space, environmental systems, and so on.

At the highest level, the invention is a fully automatic reporting digital beam torque wrench which will allow precise application of torque in easy as well as difficult access situations. In a fully featured implementation, the invention is designed to monitor its own operational status and let its operator(s) know when operational intervention is required, including but not limited to, situations such as recharging, torque limit approach, torque limit reached, and torque limit exceeded indicators.

Key technology components of the invention include a high accuracy potentiometer coupled with an input and output data display system in a small package. In a preferred embodiment, each torque action results in continuous torque condition data acquisition, recording, and transmission in multiple methods of human factors engineering feedback, including but not limited to, audible buzzer, data capture beep, numeric digital display, wireless bidirectional data and control information transmission to and from a remotely located base data management device, and torque units of measurement selection identification.

Advantageously, measurement time is reduced and is only limited by the training and physical environment access of the operator, which may be manifest in a preferred embodiment to include automated mechanical actuation of the digital beam torque wrench without direct human contact or intervention during the application of torsional force.

In accordance with another important aspect of the invention, in a given implementation a "defeatured" system having fewer than all of the optional functional elements described herein can be provided. At the lowest cost, the digital beam torque wrench itself, with only a visual indication of torsional force applied in only a single unit of measure might be deployed without inclusion of data storage, audible, protective covering of any type or other optional functional elements disclosed herein. Such a simple implementation of the invention still offers significant benefits and improvements in accuracy and minimum time to perform application of torsional forces as compared with prior art systems.

In another implementation a simple replaceable battery powered digital beam torque wrench can be included, such that the guesswork can be taken out of simple torque application and tool maintenance problems.

In summary, it is believed that an important aspect of the invention of the system is a very accurate digital beam torque wrench that can be as simple or as complex as needed for a given application.

What is claimed is:

1. A torque wrench, comprising:

a main beam having a distal end and a proximal end;

a drive element disposed at the distal end of the main beam;

a stationary beam having a distal end fixedly secured to the main beam at a first location on the main beam, and having a proximal end; and an optical displacement sensor assembly disposed at a second location associated with the main beam and with the stationary beam to detect an amount of displacement of the main beam relative to the stationary beam, the optical displacement sensor assembly including:

a surface that reflects radiation to generate an optical signal, wherein the surface is rigidly secured to one of the main beam or the stationary beam; and an actuable element that includes an optical sensor that senses the optical signal reflected by the surface, wherein the actuable element is rigidly secured to the other one of the main beam or the stationary beam.

2. The torque wrench of claim 1, wherein the first location is near the distal end of the main beam; and wherein the second location is closer to the proximal end than to the distal end of the main beam.

3. The torque wrench of claim 1, wherein the second location is at the proximal end of the main beam.

4. The torque wrench of claim 1, wherein the surface is arcuate.

5. The torque wrench of claim 1, wherein the surface includes a plurality of spaced-apart index marks each reflecting a first amount of radiation, and wherein each of a plurality of spaces between the respective ones of the plurality of spaced-apart index marks reflects a second amount of radiation not equal to the first amount of radiation.

6. The torque wrench of claim 1, wherein the surface intermittently reflects or absorbs radiation to modulate the optical signal when the main beam is displaced relative to the stationary beam.

7. The torque wrench of claim 1, wherein the optical sensor includes a photodiode.

8. The torque wrench of claim 1, wherein the optical displacement sensor assembly further comprises an optical radiation source; wherein the optical sensor detects radiation emitted by the optical radiation source.

9. The torque wrench of claim 8, wherein the optical radiation source is a light emitting diode (LED).

10. The torque wrench of claim 1, further comprising a handle assembly disposed at the proximal end of the main beam and wherein the optical displacement sensor assembly senses flexure of the main beam upon application of force upon the handle assembly.

11. The torque wrench of claim 1, further comprising an electronic element coupled to the actuable element to receive an electrical signal from the actuable element; and wherein the electronic element derives a torque value based on the received electrical signal.

12. The torque wrench of claim 1, further comprising an audio feedback unit to provide an audio indication of closeness relative to a torque set point.

13. The torque wrench of claim 12, wherein the audio feedback unit provides the audio indication in adjustable degrees of volume to indicate various degrees of closeness to the torque set point.

14. A torque wrench, comprising:

a main beam having a distal end and a proximal end;

a drive element disposed at the distal end of the main beam;

a stationary beam having a distal end fixedly secured to the main beam at a first location on the main beam, and having a proximal end; and a displacement sensor assembly disposed at a second location associated with the main beam and with the stationary beam to detect an amount of displacement of the main beam relative to the stationary beam, the displacement sensor assembly including:

an optical actuating element including an arcuate surface for reflecting radiation to generate an optical signal, wherein the optical actuating element is rigidly secured to one of the main beam or the stationary beam;

an actuable element including an optical sensor for sensing the optical signal reflected by arcuate surface, wherein the actuable element is rigidly secured to the other one of the main beam or the stationary beam; and an aperture plate having a vertically elongate slit to guide the optical signal reflected by the arcuate surface to a restricted lateral dimension.

15. A torque wrench, comprising:

a main beam having a distal end and a proximal end;

a drive element disposed at the distal end of the main beam;

a stationary beam having a distal end fixedly secured to the main beam substantially at the distal end of the main beam, and having a proximal end; and a displacement sensor assembly that generates a signal indicative of an amount of displacement of the main beam relative to the stationary beam, the displacement sensor assembly disposed near the proximal end of the main beam, the displacement sensor assembly including a Hall effect sensor rigidly secured to one of the main beam and the stationary beam and a magnetic element rigidly secured to the other of the main beam and the stationary beam;

wherein the magnetic element has a varying profile such that the magnetic element generates a magnetic field that varies along the length of the magnetic element.

16. The torque wrench of claim 15, wherein the Hall effect sensor generates an output voltage which varies in accordance with the relative position of the Hall effect sensor along the length of the elongate magnetic element.

17. The torque wrench of claim 15, further comprising an electronic element coupled to the position sensor that generates a torque amount indication for a human operator based on the signal indicative of the amount of displacement.

18. A torque wrench, comprising:

a main beam having a distal end and a proximal end;

a drive element disposed at the distal end of the main beam;

a stationary beam having a distal end fixedly secured to the main beam substantially at the distal end of the main beam, and having a proximal end; and a displacement sensor assembly that generates a signal indicative of an amount of displacement of the main beam relative to the stationary beam, the displacement sensor assembly disposed substantially at the proximal end of the main beam and including a magnetic field sensor rigidly secured to one of the main beam and the stationary beam and an actuating magnetic element rigidly secured to the other of the main beam and the stationary beam; wherein the actuating magnetic element affects a magnetic field sensed by the magnetic field sensor in proportion to a flexure of the main beam upon application of force on the handle assembly.

19. The torque wrench of claim 18, wherein the magnetic field sensor is a ratiometric Hall effect sensor; where the ratiometric Hall effect sensor generates a variable output voltage; and wherein a magnitude of the output voltage varies in proportion to the amount of lateral movement of the actuating magnetic element.

20. The torque wrench of claim 19, further comprising an electronic element that derives a torque value based on the output voltage and produces an operator signal based on the derived torque value.

21. The torque wrench of claim 20, wherein the operator signal is at least one of a visual signal, an audible signal, a tactile signal, a vibrational signal, or a resistive signal.

* * * * *